United States Patent
Yamada

(10) Patent No.: US 8,961,351 B2
(45) Date of Patent: Feb. 24, 2015

(54) CONTINUOUSLY VARIABLE TRANSMISSION

(75) Inventor: Yoshiaki Yamada, Shiraoka (JP)

(73) Assignee: UD Trucks Corporation, Saitama (JP)

( * ) Notice: Subject to any disclaimer, the term of this patent is extended or adjusted under 35 U.S.C. 154(b) by 23 days.

(21) Appl. No.: 13/820,626

(22) PCT Filed: Jun. 7, 2011

(86) PCT No.: PCT/JP2011/063058
§ 371 (c)(1),
(2), (4) Date: Mar. 4, 2013

(87) PCT Pub. No.: WO2012/035834
PCT Pub. Date: Mar. 22, 2012

(65) Prior Publication Data
US 2013/0165289 A1  Jun. 27, 2013

(30) Foreign Application Priority Data

Sep. 15, 2010  (JP) .................................. 2010-206537

(51) Int. Cl.
*F16H 37/02* (2006.01)
*F16H 37/08* (2006.01)
(52) U.S. Cl.
CPC .......... *F16H 37/022* (2013.01); *F16H 37/0846* (2013.01); *F16H 2037/088* (2013.01)
USPC ....................................................... 475/211
(58) Field of Classification Search
None
See application file for complete search history.

(56) References Cited

U.S. PATENT DOCUMENTS

| 1,015,481 A | * | 1/1912 | Draullette | 475/204 |
| 2,738,688 A | * | 3/1956 | Shaw | 475/211 |
| 2,760,386 A | * | 8/1956 | Southwick | 474/30 |
| 2,831,358 A | * | 4/1958 | Michie | 474/35 |
| 2,927,470 A | * | 3/1960 | Heyer | 474/35 |
| 2,932,216 A | * | 4/1960 | Schou | 475/143 |
| 3,128,636 A | * | 4/1964 | Graybill | 477/44 |

(Continued)

FOREIGN PATENT DOCUMENTS

| JP | 62-083553 A | 4/1987 |
| JP | 63-038757 A | 2/1988 |

(Continued)

OTHER PUBLICATIONS

International Search Report and Written Opinion corresponding to PCT/JP2011/063058, dated Aug. 16, 2011.

(Continued)

*Primary Examiner* — Dirk Wright
(74) *Attorney, Agent, or Firm* — Lowe Hauptman & Ham, LLP

(57) ABSTRACT

A continuously variable transmission includes a first gear shift mechanism for changing continuously a speed ratio of drive power input from a prime mover, a second gear shift mechanism for changing continuously a speed ratio of drive power input from the prime mover, and a planetary gear mechanism to which drive power output from the first gear shift mechanism and that output from the second gear shift mechanism are input and from which combined drive power is output to an output shaft. The planetary gear mechanism includes a sun gear, a planetary carrier and a ring gear. An output from the first gear shift mechanism and that from the second gear shift mechanism are respectively input to any two of the sun gear, the planetary carrier and the ring gear and the remaining one is coupled to the output shaft.

3 Claims, 2 Drawing Sheets

(56) References Cited

U.S. PATENT DOCUMENTS

| | | | | |
|---|---|---|---|---|
| 3,334,527 | A | * | 8/1967 | Carnegie ........................ 475/211 |
| 3,354,748 | A | * | 11/1967 | Chapman ........................ 475/211 |
| 3,376,760 | A | * | 4/1968 | Gordanier ........................ 475/25 |
| 3,670,594 | A | * | 6/1972 | Roper ........................ 475/211 |
| 4,136,581 | A | * | 1/1979 | Winter et al. ........................ 475/210 |
| 7,559,868 | B2 | * | 7/2009 | Rohs et al. ........................ 475/211 |
| 7,887,452 | B2 | * | 2/2011 | Kurihara ........................ 475/211 |

FOREIGN PATENT DOCUMENTS

| | | |
|---|---|---|
| JP | 63-186061 A | 8/1988 |
| JP | 2-125243 A | 10/1990 |
| JP | 6-331000 A | 11/1994 |

OTHER PUBLICATIONS

Office Action corresponding to JP2010-206537, dated Jul. 30, 2013.

* cited by examiner

CONTINUOUSLY VARIABLE TRANSMISSION

TECHNICAL FIELD

The present invention relates to a continuously variable transmission capable of continuously adjusting a speed ratio.

BACKGROUND ART

Conventionally, continuously variable transmissions (CVTs) such as belt type and toroidal type continuously variable transmissions have been used as automatic transmissions for vehicles.

In JP63-186061A, a belt continuously variable transmission in which a main input from an engine and an auxiliary input via a CVT are combined in a planetary gear mechanism and output to drive wheels is proposed. In this continuously variable transmission, the range of a speed ratio is enlarged by combining the main input in which an output of the engine is directly input and the auxiliary input in which an output of the engine is input via the CVT.

SUMMARY OF INVENTION

Oversized vehicles such as trucks and buses are heavier in weight than passenger vehicles. Thus, a speed ratio range which is about 1.5 to 2.0 times as large as that in passenger vehicles is generally required in oversized vehicles. Therefore, it has been necessary to make the speed ratio settable in a larger range as compared to conventional continuously variable transmissions in order to use continuously variable transmissions in oversized vehicles.

The present invention aims to provide a continuously variable transmission capable of setting a speed ratio in a larger range.

To achieve the object described above, a continuously variable transmission of this invention includes a first gear shift mechanism to which drive power is input from the prime mover and from which the drive power is output while the speed thereof is changed at a speed ratio which is continuously various, a second gear shift mechanism to which drive power is input from the prime mover and from which the drive power is output while the speed thereof is changed at a speed ratio which is continuously various, and a planetary gear mechanism to which the drive power output from the first gear shift mechanism and that output from the second gear shift mechanism are input and from which combined drive power is output to the output shaft. The planetary gear mechanism includes a rotatable sun gear, a planetary carrier rotatably and revolvably supporting rotary shafts of planetary gears engaged with outer periphery of the sun gear along the outer periphery of the sun gear, and a ring gear engaged with outer peripheries of the planetary gears and being rotatable. An output from the first gear shift mechanism and that from the second gear shift mechanism are respectively input to any two of the sun gear, the planetary carrier and the ring gear and the remaining one is coupled to the output shaft.

The details as well as other features and advantages of this invention are set forth in the remainder of the specification and are shown in the accompanying drawings.

DESCRIPTION OF EMBODIMENTS

First, the configuration of a continuously variable transmission 100 according to an embodiment of the present invention is described with reference to FIG. 1.

Figure 1:
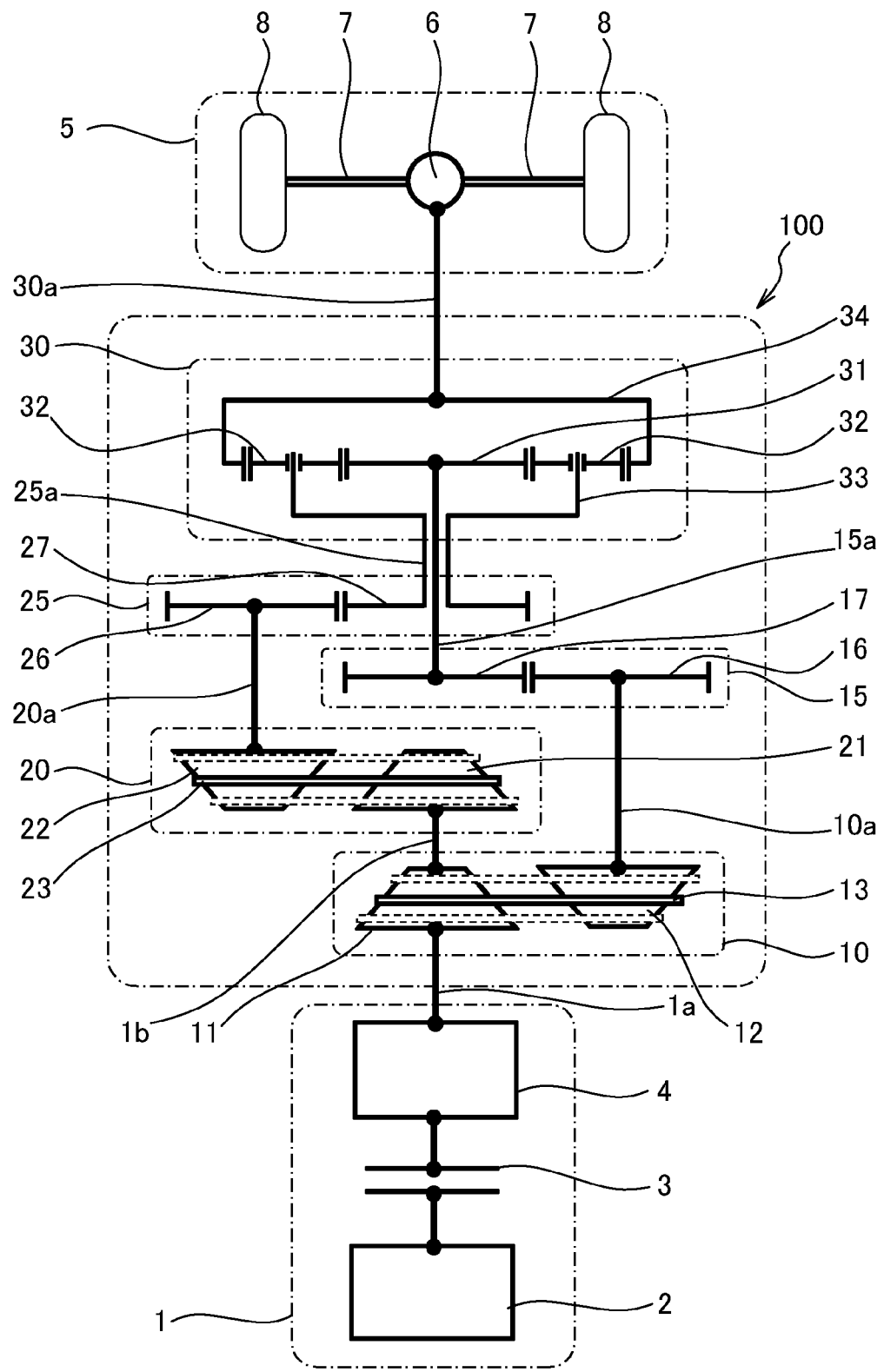
FIG. 1 is a configuration diagram of a continuously variable transmission according to an embodiment of the present invention.

As shown in FIG. 1, the continuously variable transmission 100 is installed in a vehicle and outputs drive power input from a prime mover 1 to a driving unit 5 while changing the speed of the drive power. The continuously variable transmission 100 is capable of changing the speed of the input drive power at a speed ratio which is continuously variable.

First, the configurations of the prime mover 1 for generating drive power to be input to the continuously variable transmission 100 and the driving unit 5 to which drive power output from the continuously variable transmission 100 is input are described.

The prime mover 1 includes an engine 2 which is an internal combustion engine for generating drive power, a clutch 3 which can transmit and interrupt drive power from the engine 2 and a motor 4 for further imparting drive power to drive power generated by the engine 2. An output of the prime mover 1 is output as a rotational force of an output shaft 1a. The prime mover 1 is a parallel type hybrid system for generating drive power by the motor 4 assisting an output of the engine 2.

The prime mover 1 may be a hybrid system of another type such as a series type instead of being of the parallel type. Further, the prime mover 1 may include only the engine 2 without having a hybrid system or may include only the motor 4 as in an electric vehicle.

The driving unit 5 includes a differential gear 6 to which drive power output from the continuously variable transmission 100 is input and a pair of axles 7 for respectively transmitting the drive power to left and right wheels 8 from the differential gear 6. The drive power output from the continuously variable transmission 100 is decelerated by the differential gear 6, distributed to the left and right axles 7 and transmitted to the wheels 8.

Next, the configuration of the continuously variable transmission 100 is described.

The continuously variable transmission 100 includes a first gear shift mechanism 10 to which drive power is input from the prime mover 1, a second gear shift mechanism 20 to which drive power is likewise input from the prime mover 1, and a planetary gear mechanism 30 to which drive power output from the first gear shift mechanism 10 and drive power output from the second gear shift mechanism 20 are input and from which combined drive power is output. The continuously variable transmission 100 includes a transmission mechanism 15 for transmitting drive power output from the first gear shift mechanism 10 to the planetary gear mechanism 30 and a transmission mechanism 25 for transmitting drive power output from the second gear shift mechanism 20 to the planetary gear mechanism 30.

The first gear shift mechanism 10 includes a primary pulley 11 to which drive power of the prime mover 1 is input and a secondary pulley 12. Drive power is transmitted between the primary pulley 11 and the secondary pulley 12 by a belt 13 mounted between the primary pulley 11 and the secondary pulley 12. The first gear shift mechanism 10 transmits drive power by a frictional force between the primary pulley 11 and the belt 13 and a frictional force between the secondary pulley 12 and the belt 13. The first gear shift mechanism 10 has, for example, a speed ratio of 0.5 to 2.0.

The primary pulley 11 and the secondary pulley 12 are rotating bodies which are hydraulically driven to continuously change a contact radius of the belt 13.

The primary pulley 11 is directly coupled to the output shaft 1a of the prime mover 1 and rotates integrally with the output shaft 1a.

The secondary pulley 12 is rotated by the rotation of the primary pulley 11 transmitted via the belt 13. An output shaft 10a is coupled to a rotary shaft of the secondary pulley 12. The output shaft 10a extends from the secondary pulley 12 and is coupled to the transmission mechanism 15.

The speed ratio of the first gear shift mechanism 10 has a smallest value of 0.5 when the contact radius between the primary pulley 11 and the belt 13 is minimum and that between the secondary pulley 12 and the belt 13 is maximum. On the other hand, the speed ratio of the first gear shift mechanism 10 has a maximum value of 2.0 when the contact radius between the primary pulley 11 and the belt 13 is maximum and that between the secondary pulley 12 and the belt 13 is minimum. In this way, the speed ratio is continuously adjusted according to the contact radius between the primary pulley 11 and the belt 13 and that between the secondary pulley 12 and the belt 13 in the first gear shift mechanism 10.

The transmission mechanism 15 includes a first gear 16, which is coupled to the output shaft 10a of the first gear shift mechanism 10 and integrally rotates, and a second gear 17 engaged with the first gear 16. The second gear 17 is coupled to a sun gear 31 of the planetary gear mechanism 30 via an output shaft 15a. The second gear 17 rotates integrally with the sun gear 31. The transmission mechanism 15 transmits drive power input from the output shaft 10a of the first gear shift mechanism 10 via the first gear 16 and the second gear 17 so that the drive power can be input to the sun gear 31 of the planetary gear mechanism 30.

Similarly to the first gear shift mechanism 10, the second gear shift mechanism 20 includes a primary pulley 21 to which drive power of the prime mover 1 is input and a secondary pulley 22. Drive power is transmitted between the primary pulley 21 and the secondary pulley 22 by a belt 23 mounted between the primary pulley 21 and the secondary pulley 22. The second gear shift mechanism 20 transmits drive power by a frictional force between the primary pulley 21 and the belt 23 and a frictional force between the secondary pulley 22 and the belt 23. The second gear shift mechanism 20 has, for example, a speed ratio of 0.5 to 2.0.

The primary pulley 21 is coupled to the primary pulley 11 of the first gear shift mechanism 10 via an extension shaft 1b provided coaxially with the output shaft 1a of the prime mover 1. That is, the primary pulley 21 is coupled in series to primary pulley 11 of the first gear shift mechanism 10 and integrally rotates.

The secondary pulley 22 is rotated by the rotation of the primary pulley 21 transmitted via the belt 23. An output shaft 20a is coupled to a rotary shaft of the secondary pulley 22. The output shaft 20a extends from the secondary pulley 22 and is coupled to the transmission mechanism 25.

Since the configurations of the primary pulley 21 and the secondary pulley 22 are similar to those of the primary pulley 11 and secondary pulley 12 in the first gear shift mechanism 10, specific configurations are not described here.

The transmission mechanism 25 includes a first gear 26, which is coupled to the output shaft 20a of the second gear shift mechanism 20 and integrally rotates, and a second gear 27 engaged with the first gear 26. The second gear 27 is coupled to a planetary carrier 33 of the planetary gear mechanism 30 via an output shaft 25a. The second gear 27 integrally rotates with the planetary carrier 33. The transmission mechanism 25 transmits drive power input from the output shaft 20a of the second gear shift mechanism 20 via the first gear 26 and the second gear 27 so that the drive power can be input to the planetary carrier 33 of the planetary gear mechanism 30.

The planetary gear mechanism 30 includes the rotatable sun gear 31, a plurality of planetary gears 32 engaged with the outer periphery of the sun gear 31, the planetary carrier 33 rotatably and revolvably supporting central shafts of the plurality of planetary gears 32 along the outer periphery of the sun gear 31, and a ring gear 34 engaged with the outer peripheries of the planetary gears 32 and being rotatable. The planetary gear mechanism 30 decelerates or accelerates the rotation of the sun gear 31 by the rotation of the planetary carrier 33. The planetary gear mechanism 30 combines drive powers respectively input from the first gear shift mechanism 10 and the second gear shift mechanism 20 and outputs the combined drive power to the driving unit 5 via an output shaft 30a.

The sun gear 31 is a gear having teeth formed on the outer periphery and rotatable about a central shaft. The output shaft 15a of the transmission mechanism 15 is coupled to the central shaft of the sun gear 31 and drive power is transmitted from the transmission mechanism 15 to the sun gear 31. In this way, drive power output from the first gear shift mechanism 10 is input to the sun gear 31.

The planetary gear 32 is a gear having teeth formed on the outer periphery and engaged with the outer periphery of the sun gear 31. The planetary gear 32 can rotate about the central shaft and revolve along the outer periphery of the sun gear 31 due to the engagement with the sun gear 31. A plurality of planetary gears 32 are arranged at equal angular intervals on the outer periphery of the sun gear 31.

The planetary carrier 33 is annularly formed and rotates in synchronization with the revolution of the planetary gears 32. The central shafts of all the planetary gears 32 are rotatably supported on the periphery of the planetary carrier 33. The output shaft 25a of the transmission mechanism 25 is coupled to the central shaft of the planetary carrier 33 and drive power is transmitted from the transmission mechanism 25 to the planetary carrier 33. In this way, drive power output from the second gear shift mechanism 20 is input to the planetary carrier 33. By the rotation of the planetary carrier 33, the planetary gears 32 revolve along the outer periphery of the sun gear 31.

The ring gear 34 is a gear having teeth formed on the inner periphery and engaged with the outer peripheries of the planetary gears 32. The ring gear 34 is rotatable about a central shaft by the rotation of the planetary gears 32. The output shaft 30a is coupled to the central shaft of the ring gear 34. The output shaft 30a extends from the ring gear 34 and is coupled to the driving unit 5. In this way, drive powers input from the first and second gear shift mechanisms 10, 20 are combined and output to the driving unit 5.

As described above, the planetary gear mechanism 30 is such that drive powers are input from the sun gear 31 and the planetary carrier 33 and combined drive power is output from the ring gear 34. Besides this, for example, drive powers may be input from the ring gear 34 and the planetary carrier 33 and combined drive power may be output from the sun gear 31. In this way, the planetary gear mechanism 30 is used such that drive powers are input to any two of the sun gear 31, the planetary carrier 33 and the ring gear 34 and combined drive power is output from the remaining one.

Next, functions of the continuously variable transmission 100 are described with reference to FIG. 2.

Figure 2:
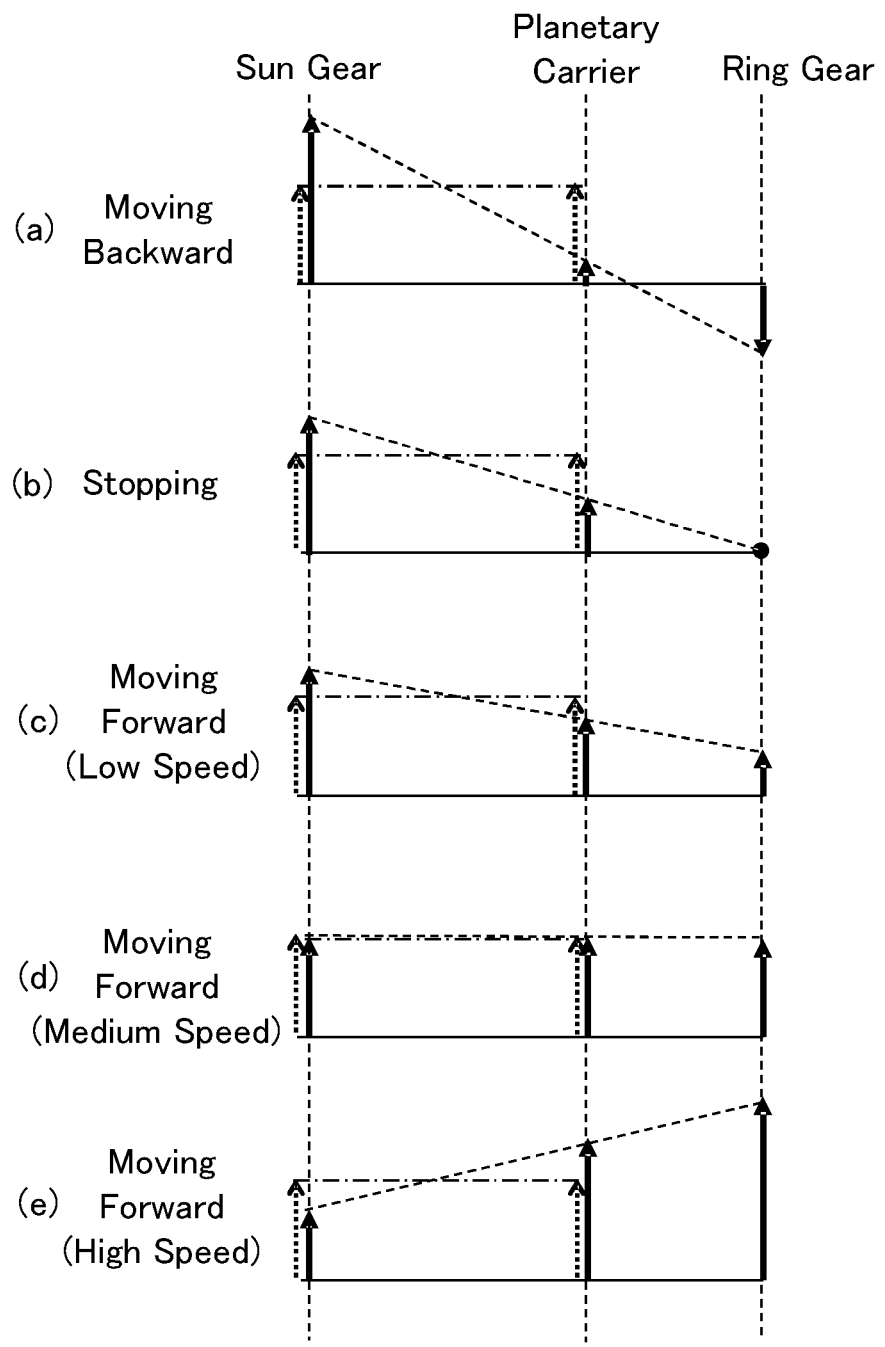
FIG. 2 is charts showing an input/output relationship in a continuously variable transmission according to the embodiment of the present invention.

In FIG. 2, solid-line arrows shown in (a) to (e) indicate the rotational speeds of the sun gear 31, the planetary carrier 33 and the ring gear 34 respectively. Further, broken-line arrows indicate the rotational speed of the output shaft 1a of the prime mover 1 caused by the engine 2 and the motor 4.

As shown in FIG. 2, the continuously variable transmission 100 decelerates or accelerates the input rotation of the sun gear 31 by the rotation of the planetary carrier 33 and outputs it from the ring gear 34. The continuously variable transmission 100 is capable of continuously adjusting the rotational speed of the ring gear 34 by adjusting the rotational speed of the sun gear 31 in the first gear shift mechanism 10 and adjusting the rotational speed of the planetary carrier 33 in the second gear shift mechanism 20.

It should be noted that the rotational speed of the prime mover 1 is constant in all states of (a) to (e). Further, the sun gear 31 and the planetary carrier 33 neither stop nor reversely rotate since the rotation of the prime mover 1 including the engine 2 is transmitted thereto. In other words, there is no likelihood that the prime mover 1 stops and the engine 2 stalls since the sun gear 31 and the planetary carrier 33 neither stop nor reversely rotate.

A state where the speed ratio of the first gear shift mechanism 10 is maximum and that of the second gear shift mechanism 20 is minimum is shown in (a) of FIG. 2. In this state, whereas the rotational speed of the sun gear 31 is maximum, that of the planetary carrier 33 is minimum. The ring gear 34 is rotated in a reverse direction by drive power obtained by combining the rotation of the sun gear 31 and that of the planetary carrier 33. In this way, the vehicle moves backward.

A state where the speed ratio of the first gear shift mechanism 10 is reduced and that of the second gear shift mechanism 20 is increased as compared with the state show in (a) is shown in (b) of FIG. 2. The ring gear 34 stops rotating since the drive power obtained by combining the rotation of the sun gear 31 and that of the planetary carrier 33 becomes zero. In this way, the vehicle stops.

A state where the speed ratio of the first gear shift mechanism 10 is further reduced and that of the second gear shift mechanism 20 is further increased as compared with the state shown in (b) is shown in (c) of FIG. 2. The ring gear 34 slowly rotates in a forward direction by the rotation of the sun gear 31 and that of the planetary carrier 33. In this way, the vehicle moves forward at a low speed.

A state where the speed ratio of the first gear shift mechanism 10 is further reduced and that of the second gear shift mechanism 20 is further increased as compared with the state shown in (c) is shown in (d) of FIG. 2. In this state, the speed ratios of the first and second gear shift mechanisms 10, 20 are both 1.0. The ring gear 34 rotates in the forward direction at a speed faster than in the state shown in (c) by the rotation of the sun gear 31 and that of the planetary carrier 33. In this way, the vehicle moves forward at a medium speed.

A state where the speed ratio of the first gear shift mechanism 10 is further reduced and that of the second gear shift mechanism 20 is further increased as compared with the state shown in (d) is shown in (e) of FIG. 2. In this state, the speed ratio of the first gear shift mechanism 10 is minimum and that of the second gear shift mechanism 20 is maximum. The ring gear 34 rotates in the forward direction at a speed faster than in the state shown in (d) by the rotation of the sun gear 31 and that of the planetary carrier 33. In this way, the vehicle moves forward at a high speed. In this state, the vehicle can run at a maximum speed.

In the state shown in (e) of FIG. 2, the rotational speed of the ring gear 34 is faster than that of the planetary carrier 33. At this time, the planetary carrier 33 is driven by the second gear shift mechanism 20 set at the maximum speed ratio. Thus, the continuously variable transmission 100 can be shifted to a larger speed ratio than a speed ratio when the second gear shift mechanism 20 is singly provided. Therefore, in the continuously variable transmission 100, the speed ratio range can be set to be larger as compared with the case where the first gear shift mechanism 10 or the second gear shift mechanism 20 is singly provided.

As described above, in the continuously variable transmission 100, forward movement, stop and backward movement of the vehicle can be freely switched with an output of the prime mover 1 kept constant by adjusting the speed ratios of the first and second gear shift mechanisms 10, 20 and adjusting the rotational speed of the sun gear 31 and that of the planetary carrier 33. Thus, it is not necessary to provide a clutch mechanism for stopping the vehicle with the prime mover 1 kept in operation, a gear for moving the vehicle backward and the like.

Further, in the continuously variable transmission 100, the speed of the vehicle at the time of forward movement and backward movement can be freely adjusted with an output of the prime mover 1 kept constant by adjusting the speed ratios of the first and second gear shift mechanisms 10, 20. Thus, by using the continuously variable transmission 100, the engine 2 can be kept at a revolving speed at which thermal efficiency is highest and fuel economy can be improved.

Here, since oversized vehicles such as trucks and buses are heavier in weight than passenger vehicles, a speed ratio range which is about 1.5 to 2.0 times as large as that in passenger vehicles is generally required.

Contrary to this, since the speed ratio of the first gear shift mechanism 10 is reduced or increased by the speed ratio of the second gear shift mechanism 20, the speed ratio range of the continuously variable transmission 100 can be made larger as compared with the case where the first gear shift mechanism 10 or the second gear shift mechanism 20 is singly provided. Therefore, the continuously variable transmission 100 is suitable for application to oversized vehicles such as trucks and buses.

It should be noted that although the speed ratio ranges of the first and second gear shift mechanisms 10, 20 are both 0.5 to 2.0 in the embodiment described above, the speed ratio range of the first gear shift mechanism 10 and that of the second gear shift mechanism 20 may be set to be different each other. By setting so, the speed ratio range of the continuously variable transmission 100 can be set at a desired speed ratio range. To achieve a similar effect, the speed ratios of the transmission mechanisms 15 and 25 may be set to be different each other.

According to the above embodiment, the following effects are achieved.

The speed ratios of drive powers input to the sun gear 31 and the planetary carrier 33 of the planetary gear mechanism 30 are respectively continuously adjusted via the first and second gear shift mechanisms 10, 20. In the planetary gear mechanism 30, the rotation of the sun gear 31 and that of the planetary carrier 33 are combined and the speed ratio of the first gear shift mechanism 10 is reduced or increased by the speed ratio of the second gear shift mechanism 20. Thus, the speed ratio range of the continuously variable transmission 100 can be made larger as compared with the case where the first gear shift mechanism 10 or the second gear shift mechanism 20 is singly provided.

Further, the vehicle can move forward, stop and move backward with an output of the prime mover 1 kept constant by adjusting the speed ratio of the first gear shift mechanism 10 and that of the second gear shift mechanism 20 in the continuously variable transmission 100. Thus, it is not necessary to provide a clutch mechanism for stopping the vehicle with the prime mover 1 kept in operation, a gear for moving the vehicle backward and the like.

Although the invention has been described above with reference to certain embodiments, the invention is not limited to the embodiments described above. Modifications and variations of the embodiments described above will occur to those skilled in the art, within the scope of the claims.

For example, although the first and second gear shift mechanisms 10, 20 are belt-drive type CVTs, they may be CVTs of another type such as chain-drive type or toroidal type.

The contents of Tokugan 2010-206537, with a filing date of Sep. 15, 2010 in Japan, are hereby incorporated by reference.

The embodiments of this invention in which an exclusive property or privilege is claimed are defined as follows:

1. A continuously variable transmission for outputting drive power of a prime mover to an output shaft while changing a speed of the drive power, the continuously variable transmission comprising:
   a first gear shift mechanism configured to receive the drive power from the prime mover and to output the drive power while changing the speed of the drive power at a speed ratio which is continuously variable;
   a second gear shift mechanism configured to receive the drive power from the prime mover and to output the drive power while changing the speed of the drive power at a speed ratio which is continuously variable; and
   a planetary gear mechanism configured to
      receive the drive power output from the first gear shift mechanism and the drive power output from the second gear shift mechanism, and
      output combined drive power to the output shaft,
   wherein the planetary gear mechanism includes:
      a rotatable sun gear,
      a planetary carrier rotatably and revolvably supporting rotary shafts of planetary gears engaged with an outer periphery of the sun gear along the outer periphery of the sun gear, and
      a ring gear engaged with outer peripheries of the planetary gears and being rotatable,
   wherein the output shaft is coupled to the ring gear,
   wherein the continuously variable transmission further comprises:
      a first transmission mechanism coupled between the first gear shift mechanism and the sun gear, the first transmission mechanism configured to transmit the drive power output from the first gear shift mechanism to the sun gear,
      a second transmission mechanism coupled between the second gear shift mechanism and the planetary carrier, the second transmission mechanism configured to transmit the drive power output from the second gear shift mechanism to the planetary carrier, and
   wherein speed ratios of the first transmission mechanism and the second transmission mechanism are different from each other.

2. The continuously variable transmission according to claim 1, wherein
   each of the first and second gear shift mechanisms includes:
      a primary pulley,
      a secondary pulley, and
      a belt mounted between the primary pulley and the secondary pulley to transmit the drive power between the primary pulley and the second pulley by, and
   the primary pulley of the first gear shift mechanism and the primary pulley of the second gear shift mechanism are coupled in series to an output shaft of the prime mover.

3. The continuously variable transmission according to claim 1, wherein
   a speed ratio range of the first gear shift mechanism is different from a speed ratio range of the second gear shift mechanism.

* * * * *